March 11, 1952 J. A. LANGER 2,588,544
BRACE SUPPORT FOR STEERING IDLER ARMS
Filed April 20, 1949
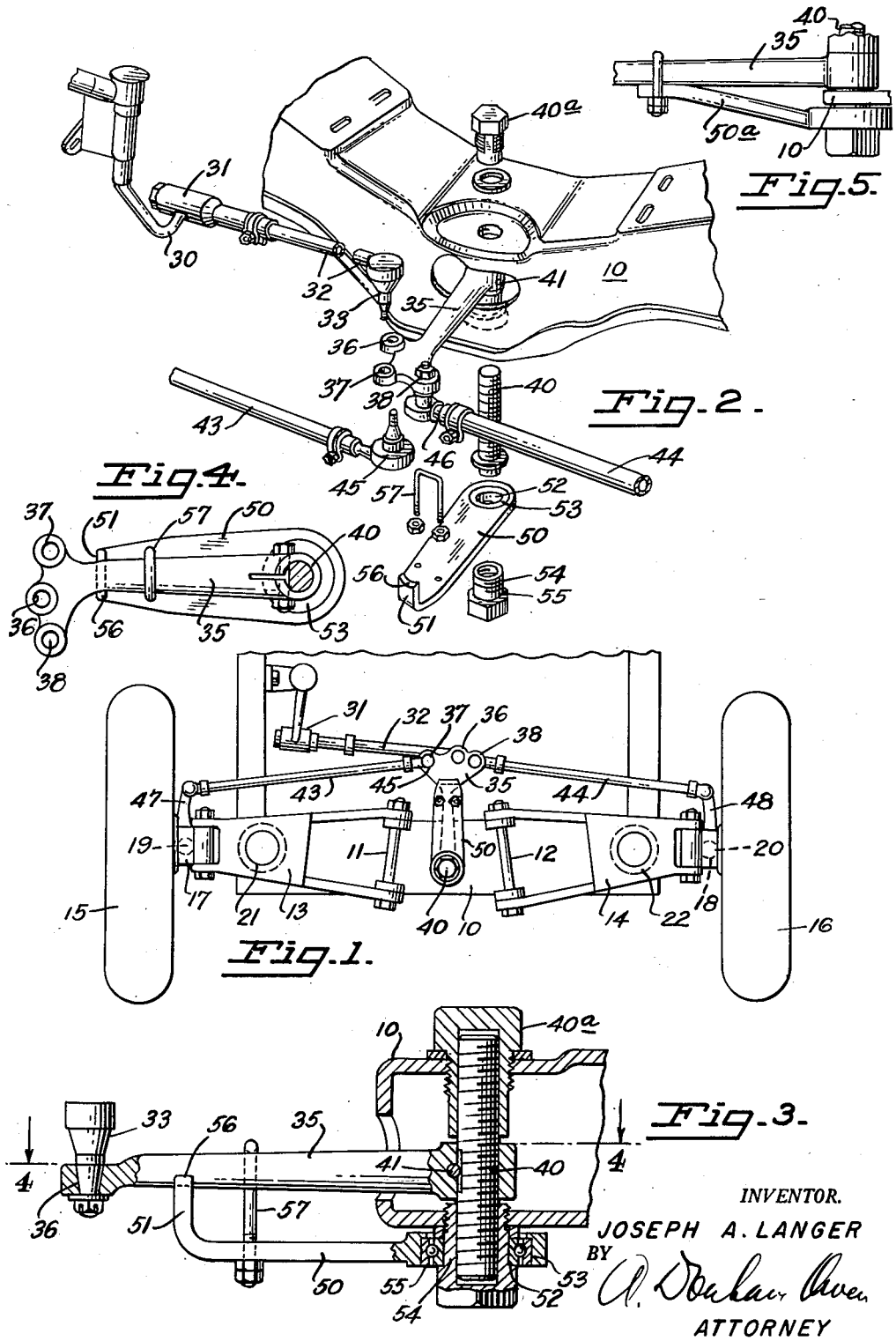
INVENTOR.
JOSEPH A. LANGER
BY
ATTORNEY Patented Mar. 11, 1952

2,588,544

UNITED STATES PATENT OFFICE 2,588,544

BRACE SUPPORT FOR STEERING IDLER ARMS

Joseph Adam Langer, San Francisco, Calif., assignor to Alex S. Lathan, San Francisco, Calif.

Application April 20, 1949, Serial No. 88,633

3 Claims. (Cl. 280—95)

This invention relates to an automobile steering mechanism and more particularly to a device for stabilizing the steering linkage used with "knee-action" spring suspension systems. The invention comprises an automobile repair unit having an idler arm stabilizer adapted for installation on the idler pin of a worn steering linkage assembly. Of course it could be installed on a new car before the parts wear and in this way prevent the wear ever occurring.

Automobile assemblies using "knee-action" front wheel suspension have the advantage of making a car ride more smoothly, because each front wheel is free to follow the contours of the road without directly affecting movement of the other front wheel, or altering the balance of the steering linkage, or transmitting shocks to the steering wheel.

However, this type of steering linkage has heretofore had the disadvantage that both the front tires and the steering linkage itself have worn out much more quickly than linkage used with the rigid type of front axle. The constant jarring, first from one wheel and then from the other or from both, loosens the idler arm, and this has caused the front wheels to shimmy. Once this shimmy has started, the tires will soon wear out. In the past this shimmy has been corrected by frequent replacement of parts of the steering linkage.

The problem has thus been how to achieve the advantage of smooth riding inherent in "knee-action" suspension without introducing the attendant disadvantages of increased wear on the steering unit and on the tires.

The object of the invention is to provide a stabilizing device for "knee-action" cars which increases the useful life of the steering mechanism; to provide a stabilizing device for an automobile steering assembly which prevents the development of shimmy in the front wheels and thereby lengthens the life of the front tires; to provide an automobile repair unit which, when installed on the idler pin of a center-point steering assembly, serves to support and stabilize the idler lever arm, thereby maintaining it in its proper position and increasing its wearing qualities; and to provide a stabilizer unit for an idler lever arm which can be incorporated into existing steering mechanisms without a complete disassembly of parts.

Other objects and advantages of the invention will appear from the following description of a preferred embodiment, illustrated and described in compliance with United States Revised Statutes Section 4888. Although this preferred embodiment is described in detail, the invention is not intended to be narrowly limited to the exact features described, except as required by the appended claims.

In the drawings:

Fig. 1 is a bottom plan view, looking up at the underside of the steering assembly of an automobile;

Fig. 2 is an exploded perspective view of the portions of the steering assembly which are adjacent the center point of the frame cross member;

Fig. 3 is a view in elevation and partly in section of the idler pin, the idler lever arm, and the stabilizing device;

Fig. 4 is a view taken looking in the direction of the arrows in Fig. 3; and

Fig. 5 is a view like Fig. 3 showing a modification.

In a center-point type of steering linkage used with "knee-action" cars, one end of an idler lever arm is rotatably supported by an idler pin mounted in the front cross member of the frame. To the other end of the idler lever is pivoted the drag link (which connects the steering lever arm to the idler lever arm) and also the two tie rods, one of which leads to each steering knuckle.

Great vertical stresses are placed on the outboard end of the idler lever arm by the bouncing of the wheels and the consequent up-and-down movement of the tie rods. These stresses exert corresponding forces on the inner end of the idler arm and it is not long before looseness begins to show up where the idler lever arm is fastened to the idler pin. Also the weight supported on the outboard end of the idler lever arm contributes to this looseness. This looseness in a vital part of the steering system is reflected in a wobbling of the front wheels of the vehicle. Tire wear becomes greater than it should be. These conditions have been observed in cars which have been driven only 5000 miles. Before this invention the remedy was to replace the idler lever arm and the idler pin or to tighten up the idler arm on the idler pin. Both of these solutions are only temporary and are makeshifts. They produce no permanent cure and the car owner is soon faced with the job to do over again.

The present invention comprises a repair unit which can be installed in very quick time and when combined with the parts already on the car it makes an idler lever arrangement which will not get loose from bouncing of the car or bouncing of the front wheels. The repair unit is made to clamp onto the idler lever arm and to be mounted on the same idler pin, but spaced farther down on it than the idler arm so as to form a sort of parallelogram or offset angular type member. This is shown clearly in Figs. 3 and 5 of the drawings.

Fig. 1 shows a center-point type of steering mechanism associated with what is known as "knee-action" suspension. The lower knee-action frames 13 and 14 are secured to the front frame cross-member 10 by pivot pins 11 and 12. Upper frames (not shown) are similarly secured to the upper part of the frame member 10, and these frames support the front wheels 15 and 16 through steering knuckle bearing supports 17 and 18 and steering knuckles 19 and 20.

Coil springs 21 and 22 extend between the lower wheel suspension frames 13 and 14 and the vehicle frame 10 and support the weight of the car and its load. When a wheel strikes a bump and moves up, its suspension frame pivots and swings up. The spring is compressed, absorbing the shock so that a minimum of jolting is transmitted to the frame.

The steering mechanism includes a steering lever arm or pitman 30 connected by a swivel joint 31 with one end of a drag link 32. The other end of the drag link 32 is rotatably secured around a socket 33, and the lower end of the socket 33 is bolted to the outboard end of the idler lever arm 35, through an opening 36. The idler lever arm 35 is the "center point" supporting unit for the entire steering linkage system. Its inner end is threaded onto the vertical idler pin 40 and is locked against rotation by a pin 41. When the car is new this thread fit is tight but as the car is used the thread loosens up and play develops with the result that the outer end of the arm 35 bobs up and down under the influence of the road conditions. The idler pin is rotatably journaled in the front frame cross-member 10 by the nuts 40a and 54.

Individual tie-rods 43 and 44 connect the steering knuckle arms 47 and 48 to the idler arm 35 where the sockets 45 and 46 are secured in the openings 37 and 38.

When a wheel 15 or 16 dips into a hole in the road or rebounds off the road the outboard end of its tie rod 43 or 44 will rise or fall with the wheel. Its inner end secured to the idler member 35 rises or falls only as the frame member 10 moves up or down. This action exerts a stress on the idler arm 35. Another stress is put on the threaded connection of the idler arm to the vertical pin 40 every time the frame member 10 moves up or down, because of the inertia and weight of the arm 35 and of the tie rods 43, 44 and 32 which it supports on its outboard end. The net result is that before long the arm 35 loosens up on the pin 40 and the nut 54 loosens up in the frame cross member and because of this looseness the arm 35 can bob up and down as the car moves along. This unwanted looseness causes the tie rods 43 and 44 to impart movement to the steering arms 47 and 48 and to the wheels. Tire wear and shimmying results.

The present invention obviates these difficulties and comprises a main supporting arm 50 which is adapted to be secured below the lever arm 35 where it can support the arm rigidly in relation to the pin 40 as shown in Figs. 3 and 5. Preferably this supporting arm comprises a hardened metal bar, having an upturned portion 51 of suitable length at its outer end and at its inner end an opening 52 fitted with a ball-bearing 53.

When installed as shown in Fig. 3 the supporting arm 50 with its upturned end 51 completes a parallelogram with the lever arm 35 and the pin 40. When these parts are tied together with the clamp 57 the outer end of the lever arm 35 no longer is free to bob up and down and cause trouble.

To add the supporting arm 50 to an existing assembly, the lower bushing nut 54 is unthreaded from the idler pin 40 and is discarded. A new nut 54, having a longer shank and oversized self-cutting threads, is substituted, and the bearing 53 fits around the stem of this nut, resting on the shoulder 55 of its keyed end. The additional length of the shank is to accommodate the thickness of the arm 50. The arm 50 is held against vertical movement, but the ball bearing 53 allows free rotation of the arm 50 in a horizontal plane. The nut 54 is threaded into the frame cross member 10 and provides the lower bearing support for the pin 40. The pin 40 rotates in the nuts 40a and 54 since its ends stop short of the bottoms of these nuts.

The upturned end 51 is preferably dished at 56 to provide a seat which fits under and supports the idler arm 35. U-bracket 57 fits over the arm 35 and firmly secures the arm 50 to the arm 35. Preferably the upturned end 51 is proportioned so that the arm 50 and the idler lever 35 are substantially parallel.

Instead of forming in general a parallelogram with the lever arm, the support arm 50a may be an angular brace completing one side of a triangular member with the base of the triangle formed by the distance along the pin 40 between where the lever arm 35 and the support arm 50a are fastened to it. This is illustrated in Fig. 5. Where the structure is made as original factory equipment the arms 35 and 50a might be in one piece in which case the pin 40 would be inserted after the arms were in position above and below the frame member. The form shown in Fig. 3 is used where there is a frame member passing between the idler arm 35 and the supporting arm 50.

While the device is described as a repair part to be applied to existing cars, it may be incorporated in the original design of a car so that the car comes equipped with the supporting arm 50. Also the device may be applied to existing cars by the dealer when the car is first sold and in that way prevent the wear on the tires from occurring.

When the device is to be applied to a vehicle that has been in use it will usually be found that the external threads on the nut 54 fit loosely in the lower portion of the frame cross member so the new nut 54 preferably is made in several degrees of oversize so that its case hardened threads will cut into the frame opening and make a tight fit. This nut 54 is screwed up into the cross member far enough so there is about a two thread clearance both between its end and the lower face of the arm 35 and between its inner end and the lower end of the threaded pin 40. This means that the new nut 54 takes up any wear and the parts are all held firmly.

When in place the arm 50 turns with the arm 35. It is easy to apply as the mechanic needs only to remove the nut 54 from the lower end of the pin 40, hold the arm 50 in position below the arm 35, thread the new nut 54 onto the pin 40, through the hole in the bearing 53, until the parts are in the position shown in Fig. 3. Then he can apply the clamp 57 and the job is complete.

On vehicles which substitute for the pin 40 and the nuts 54 and 40a a bolt to serve as the vertical pivot for the arm 35, the invention is also applicable for in that case the bearing 53 fits around the stem of the bolt. When installing the arm the mechanic replaces the bolt originally in the car with a bolt having a longer stem to accommodate the thickness of the bearing 53. Also suitable attention will be given to see that oversize parts are used to assure a tight fit of the bolt in the frame and a snug rotative fit of the arms 35 and 50 on or with the bolt.

With the support 50 in position and combined with the arm 35 the tire wear problem and the other problems which have been explained above are solved.

I claim:

1. In a vehicle steering arm mechanism adapted to be connected to and to support the steering control rods of the vehicle the combination of upper and lower frame members; upper and lower nuts, respectively non-rotatably secured vertically in said frame members, said lower nut having a retaining means thereon; a vertically arranged idler pin threaded into said nuts and supported in the frame by said nuts so that it may rotate in them employing its threads as a bearing; an idler steering arm keyed to said idler pin and extending horizontally outwardly to be connected to said steering control rods; and a rigid brace below said idler arm, said brace being rigidly secured to said idler arm near its outboard end and at its inboard end having an anti-friction supporting bearing adapted to fit around said lower nut above said retaining means to allow free rotation of said arm and brace in relation to said lower nut.

2. In a vehicle steering arm mechanism adapted to be connected to and to support the steering control rods of the vehicle, the combination of a frame; a vertical threaded member rotatably mounted in said frame and having at its lower end a flanged head; an idler steering arm keyed to said threaded member and extending horizontally to be connected to said steering control rods; and a rigid brace below said idler arm, said brace being rigidly secured to said idler arm near its outboard end and having at its inboard end an anti-friction supporting bearing adapted to be secured concentrically in relation to said threaded member adjacent its flanged head, whereby said brace rotates freely in a horizontal plane with said idler arm and restrains any vertical tilting of said idler arm in relation to said threaded member.

3. A repair and stabilizing unit, for a center-point vehicle steering arm assembly which includes upper and lower journal bearings supported in axially spaced relation in the front cross frame member of the vehicle, a threaded pin extending between said journal bearings, and an idler lever arm journaled at its inner end in said bearings; comprising an annular anti-friction bearing engaging an outer wall of one of the journal bearings and surrounding the pin, and a rigid supporting and stabilizing brace member for said idler lever arm having one end thereof journaled on said antifriction bearing and having its opposite end rigidly connected to said idler lever arm at a point adjacent the outer end thereof.

JOSEPH ADAM LANGER.

REFERENCES CITED

The following references are of record in the file of this patent:

UNITED STATES PATENTS

| Number | Name | Date |
| --- | --- | --- |
| 1,194,921 | Zeller | Aug. 15, 1916 |
| 1,303,293 | Gries | May 13, 1919 |
| 1,344,192 | Vandenburgh et al. | June 22, 1920 |
| 1,482,286 | Colley | Jan. 29, 1924 |
| 1,484,033 | Krohn | Feb. 19, 1924 |
| 1,509,031 | Sandstrom | Sept. 16, 1924 |
| 2,334,702 | Newton et al. | Nov. 23, 1943 |
| 2,371,835 | McNamara | Mar. 20, 1945 |